Figure 1:
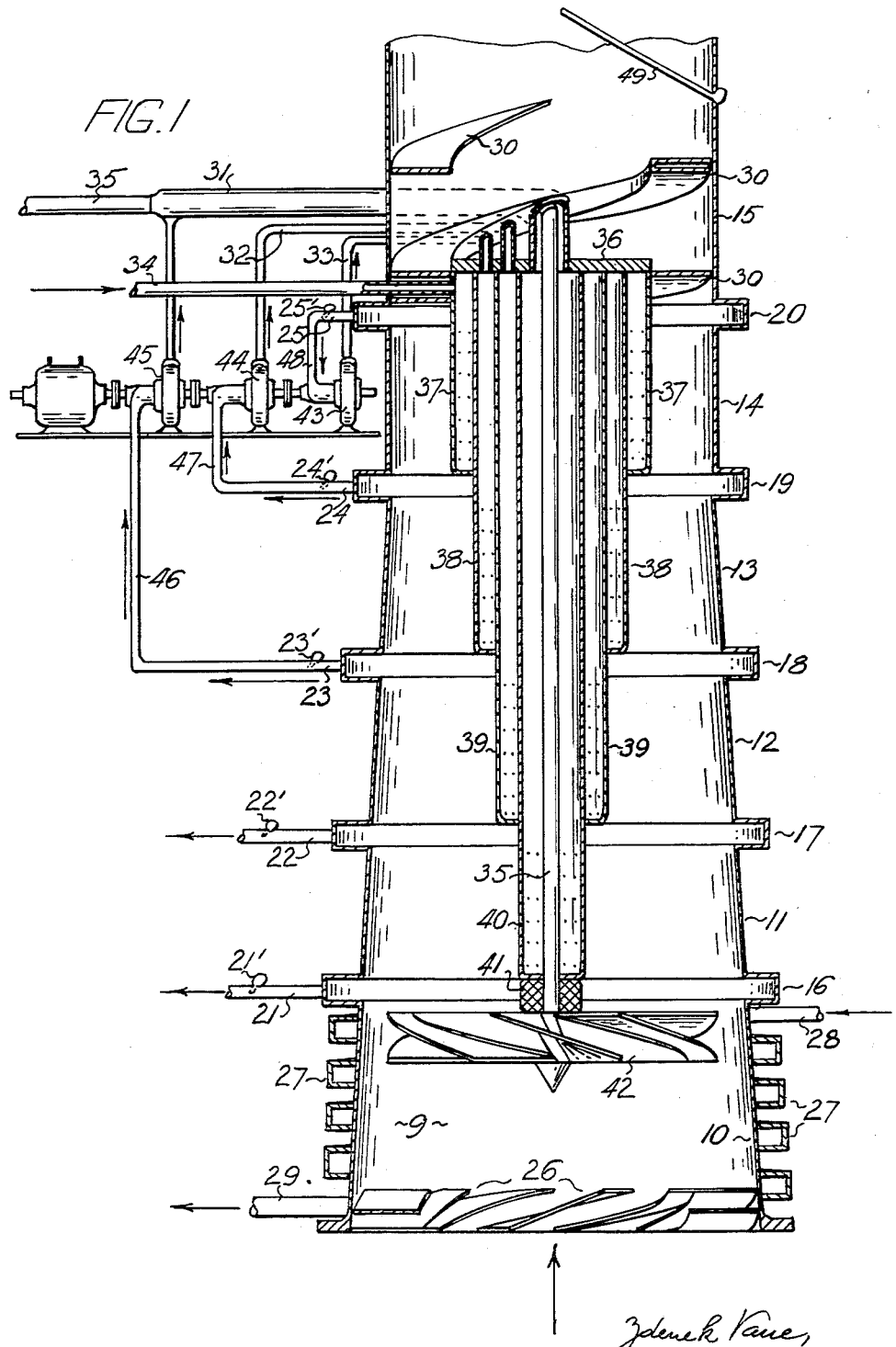

United States Patent Office 2,931,458
Patented Apr. 5, 1960

2,931,458

CENTRIFUGAL WASHER FOR DISSOCIATING INDUSTRIAL GASES

Zdenek Vane, Ottawa, Ontario, Canada

Application May 5, 1959, Serial No. 811,117

3 Claims. (Cl. 183—7)

This invention relates to a centrifugal separator for the dissociation of industrial gases. This application replaces my prior co-pending application Serial No. 649,234 filed March 28, 1957, now abandoned.

There are different ways for separating components from a gaseous carrier. Gravity, inertia, spray, magnetic force, electric precipitation, changes of pressure and temperature, chemical reactions, solvents, have been applied heretofore combined with centrifugal force, to solve such problems of separation. Combinations with centrifugal force have been achieved in mechanically rotated drums, or in cyclone-like apparatus and separations of gaseous mixtures into more than two components of solid or fluid character are performed often by combining two or more cyclones in series. Usually, a new pressure source is designed between the two cyclones, to overcome the considerable resistance they offer to the flow.

It is the purpose of my invention to introduce an apparatus showing considerable compactness, when compared with the above quoted combinations. A number of separations can be operated with one pressure source only in one instrument of great simplicity. The path of the rotating gaseous column in nearly straight, the pressure drop is very small, and the structure without any complexity. Thus, as compared with the above prior art, the costs of construction and of maintenance are cut, consumption of energy reduced, periods of performance in a given process may be shorter, and most of the facilities for an automatic control may be created. As a result, many a purification process is made possible economically, as catching soot, eliminating poisonous components from industrial fumes before their dispersion into the atmosphere, and the like.

It is an object of this invention to provide an improved assembly for putting extraction liquids or gases or fine solids into a thorough contact with the treated gases for any desired length of time and for separating them from the remainder of the treated gases when, during such contact, a selected component has become separable centrifugally by either a chemical reaction, or by passing into solution, or simply by being washed away: for example, solids as soot and other fine dust particles as radioactive fallout, can be washed out of the air or of fumes by a spray of pure water; sulphur dioxide may be extracted from chimney gases by solving it in pure water; carbon dioxide is quickly absorbed by a diluted lime-water; ammonia may be chemically combined and extracted by a solution of sulphuric acid or iron sulphate in water, and the like. Further objects and advantages will become apparent as the detailed description of this invention proceeds. It is obvious that for any apparatus construction, the chemical character of the treated gases and reagents used must be taken into account, when choosing a material for said construction, to avoid heavy corrosion of the structure parts. The structures, disclosed hereinafter, work independently from gravity and deal more specifically with the separation radially outwardly, the recovery of the caloric energy and further combinations, that with electric precipitation being optional.

Figure 2:
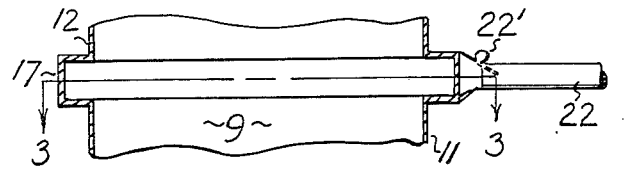
Figure 3:
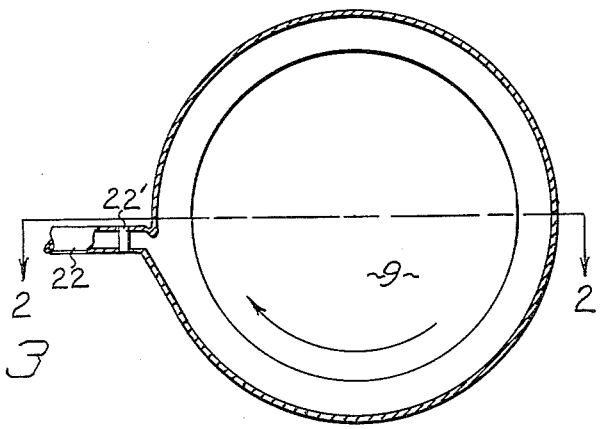
Figure 4:
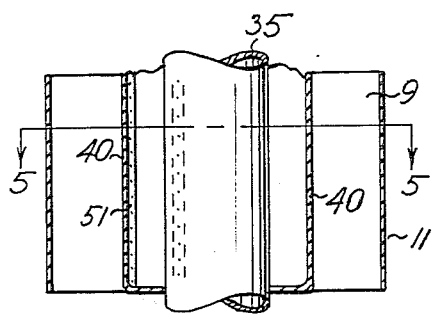
Figure 5:
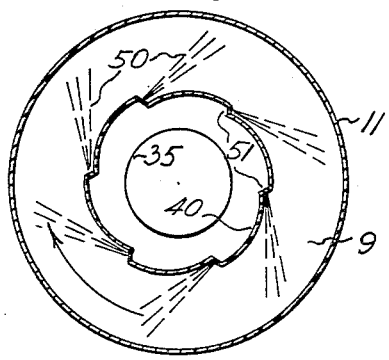

The embodiments of my invention are represented in the accompanying drawings, in which Figure 1 is an elevation partly in section of the apparatus, Figure 2 shows a section of a structure part in side elevation, Figure 3 is a plan view of the same structure part, in section along the line 3—3 of the Figure 2, Figure 4 represents a modification of another structure part in vertical section, and Figure 5 is a horizontal section of the same part along the line 5—5 of the Figure 4.

A vortex chamber 9, Figure 1, for spinning gases is built up as a tubular conduit in sections, numerals 10 to 15, with separating channels 16 to 20, inserted therebetween, each channel having a tangential outlet portion, numerals 21 to 25 respectively, provided with volume controls by suitable valves of any well known type, numerals 21' to 25'. As shown in Figures 1, 2 and 3, the separating channels are shaped as circular, widened portions of the duct to collect heavier suspended components from a spinning column, contained in the outer layer of said gases, and the purpose of said valves is to vary the volume of flow separated by each channel; said outlets being never closed completely, since no separation would then be possible. A helical body 26, fixed at the inlet end of the apparatus, imparts a rotative movement to the flow of gases entering in the direction of the arrow. It consists of a multiplicity of helically shaped vanes fastened on the wall of the section 10 and extending over about one half of its radius. A cooling jacket in the form of a conduit 27 is coiled on the outside surface of said section 10 of the tubular conduit with the purpose of recovering the caloric energy which may be contained in the treated gases; numerals 28 and 29 designate respectively an inlet and an outlet thereof. A helix 30, fixed in the tubular conduit section 15 provides a means for introducing a series of four feeding pipes 31 through 34, the first of which includes a cable 35, into the space of the vortex chamber 9, across the rotating flow of the gases. These feeding pipes are more or less parallel with each other and enclosed in one or more vanes of said helix 30, so as to cause no impedance for the helical movement of the main flow. Moreover, there is fixed in said helix 30 a plate 36 supporting an assembly of four spray tubes 37 to 40, and the cable 35 inside the tube 40, insulation 41, and a helically shaped electrode 42. The spray tubes 37 to 40 are of different lengths and diameters, graduated from small to large, and concentric with each other and with the tubular conduit sections 11 to 14; each tube is fixed by its inlet end on said supporting plate 36, while the other end of each tube is projecting out of said assembly so that each spray tube has a free portion thereof facing one of said sections 11 to 14 of said tubular conduit, as shown in Figure 1; the space between the conduit section and the spray tube is the vortex chamber 9. Said free portion of each spray tube, facing one conduit section, is finely perforated to disperse a suitable fluid or fine solids into the rotating flow of gases passing through the vortex chamber 9. The perforated end of each tube is tightly closed around the next smaller tube projecting therefrom into an adjacent conduit section. The spray fluid is supplied through the feeding pipes 31 to 34, connected individually with said spray tubes; they receive their fluid flow either from an outside source, as the pipe 34, or from auxiliary pressure sources as those marked by numerals 43, 44 and 45, which exhaust the product of separation from the tubular conduit sections 12 to 14 respectively, by ducts 46 to 48, to redeliver it individually into the spray tubes so that the spray fluid is re-sprayed progressively in the tubular conduit sections 13, 12 and 11, commencing by the numeral 13, and ending by the numeral 11. Sections 10 and 15 receive no spray. The end section 15 is provided with a variable volume or flow rate control by a suitable valve 49, of any well known type, to maintain the pressure in the vortex chamber 9 at a desired level. Section 10 is provided with a spin imparting means 26, to rotate the gases fed into the vortex chamber 9 by an outside source of pressure, not shown in the drawings.

In operation, the gases introduced under sufficient pressure into the chamber 9 and rotated by the helical body 26, are subjected to stratification, due to a centrifugal tension, the heavy solids being projected toward the wall of the section 10, the lighter solids being kept at a small distance therefrom due to the higher specific gravity of the gases, compressed in the area adjacent the wall, and to secondary vortices caused by friction of the gases on the wall. When the flow enters the area adjacent the helical electrode 42, which is a discharge electrode, the fine solids assisted by an electric charge overcome the higher density of the gases and said secondary vortices adjacent the wall, and join the coarser solids touching the wall, which functions as a negative, collecting electrode. When reaching the cavity of the separating channel 16, the solids are collected on the bottom of this channel 16 and evacuated by the pressure of the rotating gases through the outlet 21. This partial flow is controlled by impedance 21', shown schematically in the drawings. At the same time, the rotating gases have been cooled off by the cooling fluid circulating from the inlet 28 through the coiled duct 27. Very important temperature reduction may be achieved when the fixed helical body 26 is included into the cooling circuit either as a massive metallic body with a good heat conductivity, or, when the body 26 is shaped as a hollow part of the system 28—27—29 with a cooling fluid circulating inside the body 26. When cold water is fed at 28, it should finish the cooling off of the rotating gases by the first threads of the coil, and progressing further on, it meets warmer gases until at 26 it comes in contact with the hottest gases, and so it is able to achieve the highest possible temperature before leaving through 29. It is obvious that in achieving such complete cooling, a greater length of conduits may be necessary and that two or more tubular conduit sections may be applied, which will enable the separating of coarser solids to be extended on a number of sections. This way of countercurrent cooling is further applied as a countercurrent washing of the rotating gases by the system of spray tubes, numerals 37 through 40.

Rotating gases reaching the tubular conduit section 14, receive a shower of suitable fluid as, for example, pure water, coming from the inlet end of the pipe 34 and dispersed by the spray tube 37 into the space of the section 14. The finely dispersed fluid is taken along by the whirling gaseous column and rotated along and projected toward the wall of section 14, after having been for an instant in a most intimate contact with all layers of the rotating gases. By this contact with the pure solvent, the bringing into solution of the remnant of the selected gaseous component entering from the section 13 immediately preceding, should be accomplished. In fact, the maximum effectiveness of the spray is obtained only when putting the weakest soluble gaseous component in contact with the pure solvent. The separating channel 20 collects this fluid product, which is the solution of the selected gas, and evacuates it through the outlet 25 into the duct 48. The pressure source 43 exhausts it and redelivers it by the feeding pipe 33 into the spray tube 38. It is dispersed here again to meet richer gases and increases its content of the selected component, to be collected and separated by the channel 19, evacuated through outlet 24, and exhausted through duct 47 by the pressure source 44, and compelled through the feeding pipe 32 into the spray tube 39, to be dispersed in the tubular conduit section 12. The same cycle is repeated by numerals 18, 23, 46, 45 and 31, and the enriched solution is dispersed in the conduit section 11 by the spray tube 40. The gases here being richest, the solution must achieve its highest possible concentration. This concentrate is collected and separated by the channel 17, and evacuated by the outlet 22, controlled by damper 22'.

This process may be extended, obviously, on a greater number of conduit sections than recited. It may concern one selected gaseous component, while some other gaseous components remain in the circuit. Thus, a new series of tubular conduit sections, more or less equally equipped are set up, down stream from the helix 30, with another set of feeding pipes and spray tubes, connections being again provided so as to gradually increase the concentration of the obtained solution. Obviously, a new spray fluid may be applied to obtain extraction of a new component. The pressure sources 43, 44 and 45 are mounted on the same shaft, without any volume control, and will handle the same volume of fluid. If this is not satisfactory, they may be provided with volume controls, and, optionally, with separate sources of energy. The conduit sections 10, 11, 12 and 13 are tapered; they may be cylindrical as well, or be provided with another suitable shape; the diameter of two adjacent sections need not be the same at the point of connection. On the contrary, the decreasing diameter gives more space for the separating area, if desired. Helical bodies such as 26 and 42, may be present in any conduit section where a new rotative impulse is needed, the pitch of these bodies may be different so as to increase or reduce the angular velocity of the flow. The inflection vanes need not extend on the whole radius of a tubular conduit section; that part of the gaseous flow which does not contact the vanes, is rotated due to the viscosity of the fluid. The rotating gases may be caused to expand, when the diameter of the vortex chamber 9 is increased. The cross-section area of the vortex chamber should be computed with respect to all volume reductions by condensation, cooling, and by partial separations. When the constitution of the fed gases is variable, and the process cannot be performed in the apparatus parts having a constant cross-section area, the missing gas may be periodically replaced by a neutral substitute, as air, to accommodate the varying volume of treated gases. When there is an excess of gases, they will be evacuated. The pressure in the tubular conduit is to be controlled by a damper on the outlet end.

The action of electrostatic precipitation is not indispensable, but it saves one or more separating steps which would be necessary, when centrifugal force alone is applied for a complete separation of fine solids. If performed without a spray, such separation of solids performed without electric precipitation would require a more complex apparatus structure. It is obvious that a separable component which is to be discarded after separation, will not be the object of a countercurrent washing in stages with concentration as recited above. Thus, the series of pressure sources, numerals 43, 44 and 45, may be replaced by one source only, as that at 34, and the product of the spray may be evacuated in one flow, if desired. The above described structure may be extended on the outlet end as well as on the inlet end. The cooling installations may be continued in many more sections with decreasing radii. It will be dispensed with, when cooling is omitted. The main pressure source may be placed in the circuit so as to cause a part of the flow of gases, the up-stream part, to be moved by suction, thus under a reduced pressure. The suction reduces the pressure in the vortex chamber, which fact may be useful in separating fine solids; obviously, such separated product is to be evacuated by special exhausting means to overcome the pressure differences and to keep the flow in the two branches of the vortex chamber in desired directions. Propelling hot gases by suction will have the advantage of enabling the gases to be cooled off before they reach the pressure source.

It will be noted that the fine perforations of the spray tubes 37 to 40 should have such direction as to project the fine spray particles in as nearly the same direction as possible with the rotating gases, this to avoid useless reduction of the flow velocity. A thin cylindrical wall may be provided with fine perforations having a tangential direction, when a shallow depression is first operated in said wall, then one or several fine holes are punched on that portion of said depression where the curved surface is approximately parallel with a radius of the tube. Such individual depressions may be joined into narrow flat strips extending lengthwise in the surface of the spray tube, and the fine perforations are operated on these narrow strips. Figures 4 and 5 show in sections such a finely corrugated tube 40, able to provide fine jets of the spray fluid 50 in the desired tangential direction, resulting from this arrangement of the narrow strips 51. Finally, each strip 51 may be replaced by a fine independent spray pipe provided with convenient perforations, and the series of such spray pipes will be branched on each of the feed pipes, numerals 31 to 34; the lower ends of the spray pipes being closed by removable plugs to facilitate inspection, and the space between them being filled with light partitions to define the inner periphery of the vortex chamber 9. Inflection vanes may be fixed in any one conduit section where needed, they may be shaped so as to give a combined service as, for example, spray, cooling, magnetic or electrostatic field, and alike. The helix 30 in the Figure 1 gives passage for feeding pipes 31 to 34, concealing them, without disturbing the spin of the flowing gases.

The assembly of the apparatus may be achieved by different means as riveting, welding, screwing of circular parts, allowing for a ready replacement; connections of conduit sections by separate gaskets, the separating column being enclosed in a supporting structure of some cheaper material as wood, concrete, cast iron, aluminum, and the separating channels 16 to 20 carved in the gasket or in the supporting structure. The sections may be shaped differently, according to the process requirements, their walls may be provided with openings for screening or spraying radially inwardly, the use of the herein disclosed apparatus being in no way limited to the specific task herein described.

Various modifications will suggest themselves to those skilled in the art, and it will be understood that this invention is not limited to the specific construction shown, except as expressly defined in the appended claims.

I claim:

1. Apparatus for dissociating and extracting industrial gases by counterflow washing, comprising a tubular conduit having an inlet and an outlet portion, fixed spin imparting means at the inlet portion, a flow rate control means in said outlet portion, said conduit further comprising a plurality of circular separating channels inserted in the wall thereof, said channels being arranged in spaced relation to each other lengthwise of said conduit and dividing said conduit into a plurality of sections, said conduit further having a plurality of spray tubes placed therein, said tubes varying in length and diameter and being concentric with each other and with said conduit, said conduit further having a tubular helix providing inlets for a plurality of feeding pipes from outside into said spray tubes and protecting said feeding pipes against corrosion from the passing flow of gases and protecting the spin of said gases against any disturbance by said pipes, the opposite bottom portions of said spray tubes being closed and projecting therefrom into said conduit sections, said spray tubes being finely perforated on the conduit facing side thereof to disperse said spray fluid into said gases, draining means in each of said separating channels to remove the spray product therefrom, a plurality of ducts for said draining means and constituting redelivering means to feed the drained spray fluid back into said spray tubes, said ducts each being provided with a pressure source to impel said spray fluid into said spray tubes, connecting means for said ducts to redeliver the spray product from a point beyond a given section in the direction of flow of said gases to the section immediately preceding said section, and to continue from section to section in like manner in a counterflow washing of said gases so that the spray fluid is progressively resprayed in all of said conduit sections and has gradually enriched its contents of extracted components.

2. The structure of claim 1 wherein said conduit section nearest to said inlet portion is provided with a suitable cooling jacket to reduce the temperature of the treated gases before said spray is applied, said jacket containing a cooling fluid circulating in opposite direction to said treated gases.

3. The structure of claim 1 wherein a discharge electrode for an electrostatic precipitation field is provided in said conduit section nearest said inlet portion, said electrode being shaped as a helical body to impart a spin to the treated gases, said electrode being fixed on the smallest of said spray tubes projecting into the first section of said conduit, said electrode thus imparting a positive charge to particles passing by in a whirling flow of gases and thereby impelling them toward the wall of said conduit section, thus enabling them to be intercepted by one of said separating channels, said wall providing a negative electrode of said electrostatic field.

References Cited in the file of this patent

UNITED STATES PATENTS

| | | |
|---|---|---|
| 1,110,868 | Bauer | Sept. 15, 1914 |
| 1,870,351 | Wagner | Aug. 9, 1932 |
| 2,143,628 | Lea | Jan. 10, 1939 |
| 2,259,033 | Fisher | Oct. 14, 1941 |
| 2,368,828 | Hanson et al. | Feb. 6, 1945 |